US009906856B2

(12) United States Patent
Obana et al.

(10) Patent No.: US 9,906,856 B2
(45) Date of Patent: Feb. 27, 2018

(54) HAND-HELD INFORMATION PROCESSING APPARATUS

(71) Applicant: Kazutoshi Obana, Kyoto-shi, Kyoto (JP)

(72) Inventors: Kazutoshi Obana, Kyoto (JP); Kochi Kawai, Kyoto (JP); Junichiro Miyatake, Nagaokakyo (JP); Shoji Masubuchi, Kyoto (JP); Takafumi Aoki, Kyoto (JP); Kei Yamashita, Kyoto (JP); Masahiko Inami, Yokohama (JP); Kouta Minamizawa, Yokohama (JP)

(73) Assignee: Nintendo Co., Ltd., Kyoto (JP)

( * ) Notice: Subject to any disclaimer, the term of this patent is extended or adjusted under 35 U.S.C. 154(b) by 118 days.

(21) Appl. No.: 14/958,332

(22) Filed: Dec. 3, 2015

(65) Prior Publication Data
US 2016/0192067 A1 Jun. 30, 2016

(30) Foreign Application Priority Data

Dec. 26, 2014 (JP) .................................. 2014-265034

(51) Int. Cl.
H04R 1/40 (2006.01)
H04R 1/28 (2006.01)
H04R 3/12 (2006.01)
H04R 5/02 (2006.01)

(52) U.S. Cl.
CPC ........... *H04R 1/403* (2013.01); *H04R 1/2842* (2013.01); *H04R 3/12* (2013.01); *H04R 5/02* (2013.01); *H04R 2430/01* (2013.01); *H04R 2460/07* (2013.01); *H04R 2499/11* (2013.01)

(58) Field of Classification Search
CPC ........ H04R 1/403; H04R 1/2842; H04R 3/12; H04R 5/02; H04R 2430/01; H04R 2460/07; H04R 2499/11
USPC .......................................................... 381/334
See application file for complete search history.

(56) References Cited

U.S. PATENT DOCUMENTS

| 2003/0067440 | A1* | 4/2003 | Rank ....................... G06F 3/016 345/156 |
| 2012/0046106 | A1* | 2/2012 | Ito ........................................ 3/42 |
| 2013/0318438 | A1* | 11/2013 | Afshar .................... G06F 3/016 715/702 |

FOREIGN PATENT DOCUMENTS

JP          2003-275464          9/2003

* cited by examiner

Primary Examiner — David Ton
(74) Attorney, Agent, or Firm — Nixon & Vanderhye, P.C.

(57) ABSTRACT

A non-limiting example information processing apparatus comprises a housing, and a left speaker and a right speaker are provided in a left end portion and a right portion of the housing and in an inside of this housing. Each speaker is arranged such that a vibration direction of a diaphragm becomes in a direction perpendicular to a plane surface of a display panel that is provided in the front of the housing. Sound emission portions for emitting sounds from the speakers are formed in both end portions of the housing and on a side surface at near side or this side that the speakers are arranged. Therefore, sounds are emitted toward a side of a player who holds the information processing apparatus. A vibrator that is provided between the two speakers is driven simultaneously with the speakers or in a predetermined order.

11 Claims, 7 Drawing Sheets

PRESENTING EXAMPLE OF SOUND AND VIBRATION

FIG. 1(A) PERSPECTIVE VIEW
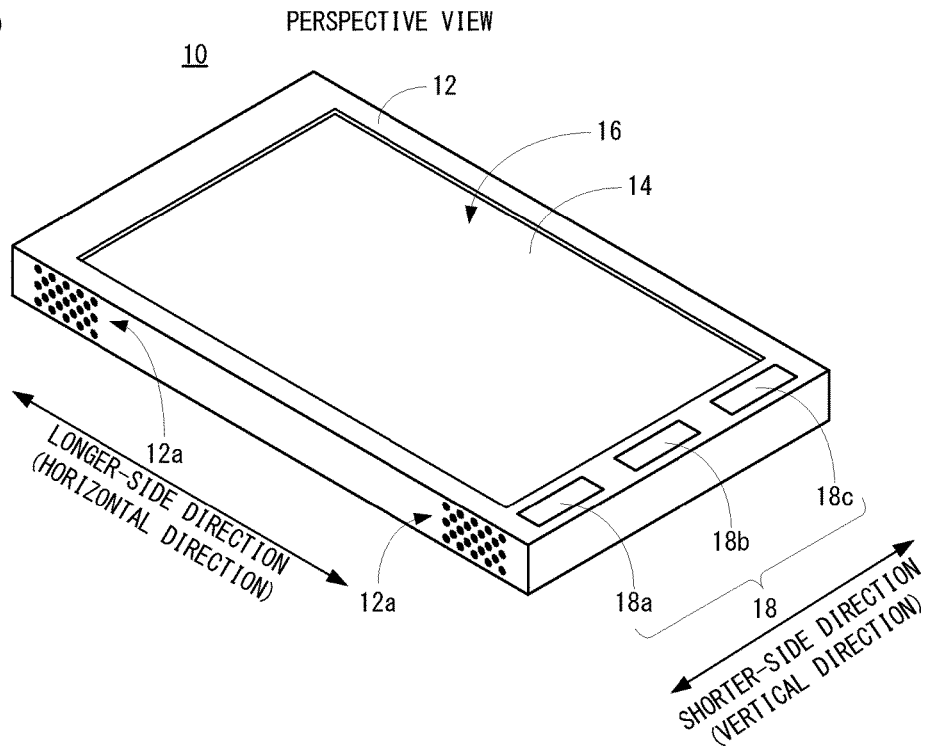
FIG. 1(B) FRONT VIEW
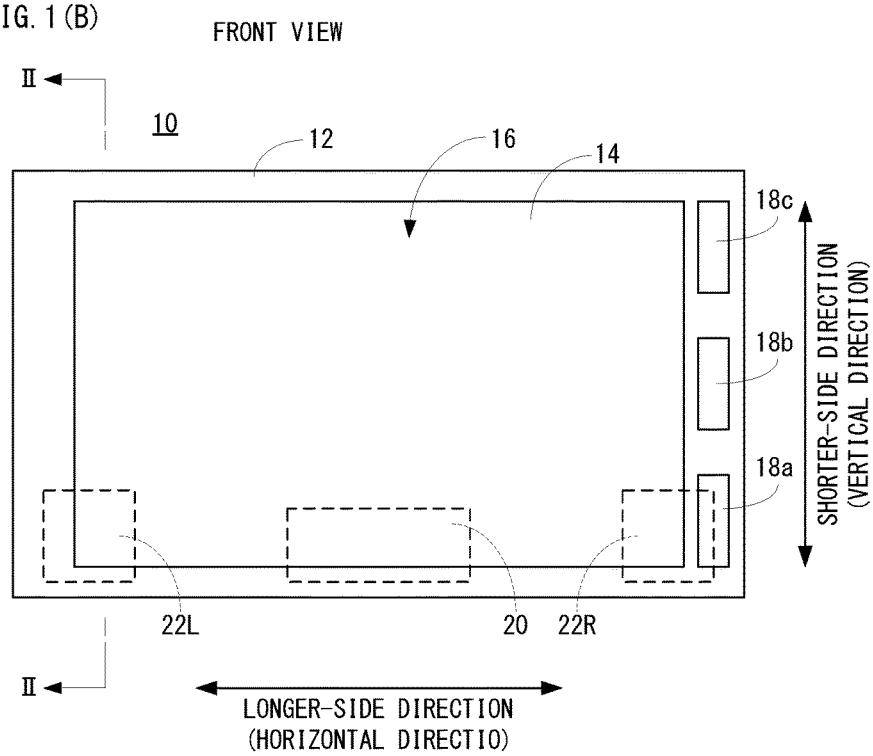

HAND-HELD INFORMATION PROCESSING APPARATUS

CROSS REFERENCE OF RELATED APPLICATIONS

The disclosures of Japanese Patent Application No. 2014-265034 filed on Dec. 26, 2014 is incorporated herein by reference.

FIELD

This application discloses a hand-held information processing apparatus comprising a speaker and a vibrator.

SUMMARY

A primary object of an embodiment(s) is to provide a novel hand-held information processing apparatus.

Another object of the embodiment(s) is to provide a hand-held information processing apparatus capable of giving a higher sense of immersion.

A first embodiment is a hand-held information processing apparatus comprising a housing, two speakers and a vibrator. The two speakers are provided in the left and right of an inside of the housing with an interval. The vibrator is provided in the inside of the housing, and vibrated with a pattern according to an arbitrary input waveform.

According to the first embodiment, it is possible to present various kinds of information by means of a sound and vibration by using the vibrator. Furthermore, it is possible to localize not only the sound but the vibration depending on a way of generating the sound and the vibration. Therefore, since a progress situation of an application being performed in the information processing apparatus can be presented by the sound and the vibration, it is possible to give a user a higher sense of immersion.

A second embodiment is according to the first embodiment, wherein the vibrator is arranged in a place except left and right end portions of the housing.

According to the second embodiment, it is possible to prevent the vibration from leaning to either of the left and right end portions.

A third embodiment is according to the first embodiment, wherein the vibrator is arranged between the left and right end portions of the housing.

According to the third embodiment, it is possible to localize not only the sound but the vibration depending on a way of generating of the sound and the vibration. Therefore, presentation of various kinds of information is possible.

A fourth embodiment is according to the first embodiment, wherein the vibrator is arranged between the two speakers.

According to the fourth embodiment, like the third embodiment, it is possible to localize not only the sound but the vibration depending on a way of generating of the sound and the vibration.

A fifth embodiment is according to the first embodiment, wherein the vibrator is arranged in a position that overlaps with one speaker between the two speakers.

A sixth embodiment is according to the second embodiment, wherein the speakers are arranged in the left and right end portions or near.

According to the sixth embodiment, since the speakers are arranged in the left and right end portions that a user holds or near, the vibration that is generated when the speakers output the sounds can be also transferred to the user.

A seventh embodiment is according to the first embodiment, wherein the vibrator includes a linear motor.

According to the seventh embodiment, since the linear motor is used, the vibrator can be driven with a pattern according to an arbitrary input waveform such as a sound signal. Therefore, it is possible to make the vibration synchronize with the sound that is output from the speaker. Furthermore, when the sound signal is input to the speaker and the vibrator, it is possible to provide the user with sound and vibration having a sense of unity.

An eighth embodiment is according to the first embodiment, and further comprises two operating portions provided on the left and right of the housing with an interval, and a vibration control module configured to vibrate the vibrator according to an operation of at least each of the two operating portions.

According to the eighth embodiment, since the vibrator is operated according to the operation of the operating portions, it is possible to suggest content of operation, for example depending on a way of vibrating the vibrator.

A ninth embodiment is according to the first embodiment, and further comprises a speaker control module configured to operate the two speakers such that volume of the sounds that are output from the two speakers are changed during the vibrator is vibrating.

According to the ninth embodiment, the user has an illusion that the localization of the vibration is changing according to a change of the localization of the sound. Therefore, it is possible to present (notify) a manner that an object moves in a virtual space by the vibration, for example.

A tenth embodiment is according to the ninth embodiment, wherein the speaker control module is configured to operate the two speakers such that the volume of the sound that is output from one speaker is gradually decreased and the volume of the sound that is output from the other speaker is gradually increased.

An eleventh embodiment is according to the ninth embodiment, wherein the speaker control module is configured to operate the two speakers such that during the volume of the sound that is output from one speaker is being gradually decreased, the volume of the sound that is output from the other speaker is gradually increased.

According to the tenth and eleventh embodiments, like the ninth embodiment, it is possible to present (notify) a manner that the object moves in the virtual space by the vibration, for example.

A twelfth embodiment is according to the first embodiment, and further comprises a vibration control module configured to vibrate the vibrator with a magnitude in proportion or inverse proportion to the volume of the sound that is output from the speaker.

According to the twelfth embodiment, it is possible to present various kinds of information by linking the sound and the vibration with each other.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 1 shows schematic structural view showing an appearance of a non-limiting example information processing apparatus, wherein FIG. 1(A) is a perspective view obliquely viewing down the information processing apparatus, and FIG. 1(B) is a front elevation view viewing the information processing apparatus from the front.

FIG. 5 shows a non-limiting example output of speakers and a vibrator of the information processing apparatus, wherein

DETAILED DESCRIPTION OF NON-LIMITING EXAMPLE EMBODIMENTS

Figure 2:
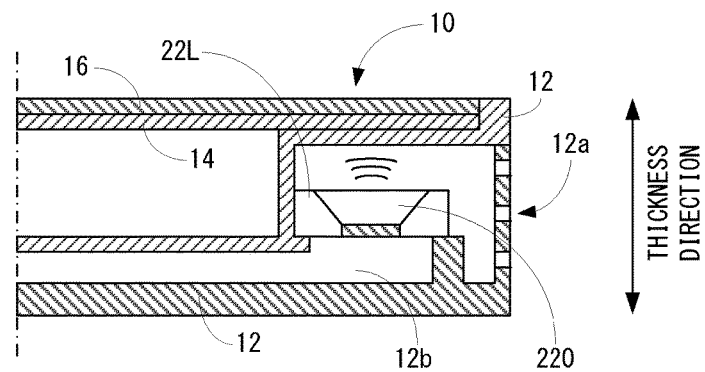
FIG. 2 is a partial sectional view of the non-limiting example information processing apparatus.

With referring to FIG. 1(A) and FIG. 1(B), a non-limiting example information processing apparatus 10 comprises a housing 12, and a display panel 14 is provided on one main surface (front surface) of the housing 12. As the display panel 14, an LCD, an EL display, etc can be used, for example. Furthermore, as the display panel 14, a display panel capable of seeing a stereoscopic image with naked eyes. In such a case, an LCD of a lenticular system using a parallax barrier system or a sheet with concaves/convexes (lenticular lens), for example.

The housing 12 is formed in a shape of a rectangle when viewing from the front. A user or player (hereinafter, simply called "player") can hold the housing 12 with one hand or both hands. As described above, the display panel 14 is provided in the front of the housing 12, and this display panel 14 is also formed in a shape of a rectangle when viewing from the front. Furthermore, there are provided with three hardware keys (operating buttons) 18a, 18b and 18c near the display panel 14 on the front of the housing 12. Hereinafter, there is an occasion that the operating buttons 18a, 18b and 18c are called "operating button 18" collectively.

In addition, FIG. 1(A) is a perspective view obliquely viewing down the front of the information processing apparatus 10, and FIG. 1(B) is a front elevation view viewing the information processing apparatus 10 turned sideways from the front. Furthermore, as shown in FIG. 1(B), when viewing the information processing apparatus 10 sideways, a longer-side direction may be called a horizontal direction and a shorter-side direction may be called a vertical direction. Furthermore, in FIG. 1(B), a direction perpendicular to a paper surface may be called a thickness direction of the information processing apparatus 10 (see FIG. 2).

Furthermore, a left speaker 22L and a right speaker 22R are provided in an inside of the housing 12. The left speaker 22L and the right speaker 22R are provided in end portions in the horizontal direction of the housing 12 or near when the player holds the information processing apparatus 10 (housing 12) with both hands sideways and in a lower portion (near side or this side) of the housing 12. As shown also in FIG. 1(B), when rendering the information processing apparatus 10 sideways, this information processing apparatus 10 (housing 12) is in an oblong shape.

As shown in FIG. 1(B), in this embodiment, the left speaker 22L and the right speaker 22R are provided in positions that at least parts of the positions overlap with the display panel 14 in the thickness direction, that is, in a direction that the housing 12 is viewed from the front. However, at least one of the left speaker 22L and the right speaker 22R may be provided in a position that does not overlap with the display panel 14 in the thickness direction (see FIG. 8). That is, at least one of the left speaker 22L and the right speaker 22R may be provided in one of the left and right end portions of the housing 12 or near.

Furthermore, a part of II-II sectional view shown in FIG. 1 (B) is shown in FIG. 2. As shown in FIG. 2, the left speaker 22L (22R is also the same) is arranged such that a vibrating direction of a diaphragm 220 is rendered perpendicular or approximately perpendicular to a surface of the housing 12 (a displaying surface of the display panel 14). Therefore, it is possible to lessen a thickness of the information processing apparatus 10 (housing 12) than a planar size of the diaphragm 220. That is, it is possible to make the information processing apparatus 10 as thin as possible.

Furthermore, holes (hereinafter, called "sound emission portion") 12a for emitting the sounds from the left speaker 22L and the right speaker 22R are formed on a side surface of the housing 12 at this side of places that the left speaker 22L and the right speaker 22R are provided and in the left and right end portions in the horizontal direction in which the left speaker 22L and the right speaker 22R are provided, respectively. That is, the sound emission portion 12a is formed such that the sound is emitted in a direction perpendicular or approximately perpendicular to the vibrating direction of the diaphragm 220. Furthermore, since the sound emission portion 12a is thus provided on this side of the housing 12, it is possible to prevent the whole apparatus from becoming large. Specifically, when providing the sound emission portion 12a on a front surface of the housing 12, it is necessary to avoid components such as the display panel 14, etc., and in order to secure an area for providing the sound emission portion 12a, the whole apparatus becomes large. However, in the information processing apparatus 10 of this embodiment, since it is not necessary to secure the area for providing the sound emission portion 12a with avoiding the components such as the display panel 14, etc. by providing the sound emission portion 12a in this side of the housing 12, it is avoidable that the whole apparatus becomes large.

As shown also in FIG. 1(B) and FIG. 2, in this embodiment, the left speaker 22L and the right speaker 22R are arranged near the sound emission portions 12a. Therefore, it is possible to emit the sounds to an outside of the housing 12 without attenuating the sounds inside the housing 12. Furthermore, a duct 12b is provided on a rear surface side of the left speaker 22L (22R is also the same) inside the housing 12. Although it cannot see in the drawings, a hole is provided on a rear surface side of the left speaker 22L (22R is also the same), and the air can move within the duct 12b in accordance with the vibration of the diaphragm 220. For example, a volume within the duct 12b is determined according to a size, material, etc. of the diaphragm 220 of the left speaker 22L. Therefore, a sound having a relatively good sound quality is output in the information processing apparatus 10. Furthermore, by using the left speaker 22L and the right speaker 22R a stereo sound can also be output. Hereinafter, when there is no necessity of distinguishing the left speaker 22L and the right speaker 22R especially, "speaker 22" is used simply.

In addition, although omitted in FIG. 2, below the display panel 14 and the touch panel 16 (lower part in the thickness direction) and in the inside of the housing 12, a control circuit board on which respective electronic components are mounted and a battery (secondary battery) are arranged.

Furthermore, as shown in FIG. 1(B), in this embodiment, a vibrator 20 is provided between the left speaker 22L and the right speaker 22R and in the inside of the housing 12. As shown also in FIG. 1(B), the vibrator 20 is provided on a straight line connecting the left speaker 22L and the right speaker 22R to each other and at this side of the housing 12. In addition, this vibrator 20 is arranged so as not to be brought into contact with the above-described control circuit board. The vibrator 20 is a linear motor that outputs (vibrates) with a pattern according to an input waveform of an analog signal (drive signal) such as a sound signal. The analog signal (drive signal) can be obtained by converting data that is given as a digital value instructing a signal value at each time, for example, and is stored in advance in a flash memory 54 (described later), etc. into an analog signal. The linear motor as the vibrator 20 outputs vibration with a pattern according to an input waveform by changing a position of an internal weight according to the signal value at each time of the analog signal.

In addition, in this embodiment, although the linear motor is used as the vibrator 20, there is no necessity of being limited to a linear motor, and a piezoelectric device or a voice coil can be used.

Furthermore, as shown well in FIG. 2, the touch panel 16 is provided on the upper surface of the display panel 14, and the touch panel 16 is set-up as the same shape (size) as the display panel 14 in this embodiment. That is, the touch panel 16 is also in a shape of rectangular. Therefore, in a whole display area of the display panel 14, a touch input is possible. As the touch panel 16, a touch panel of an electrostatic system or a resistance film system can be used, for example.

Figure 3:
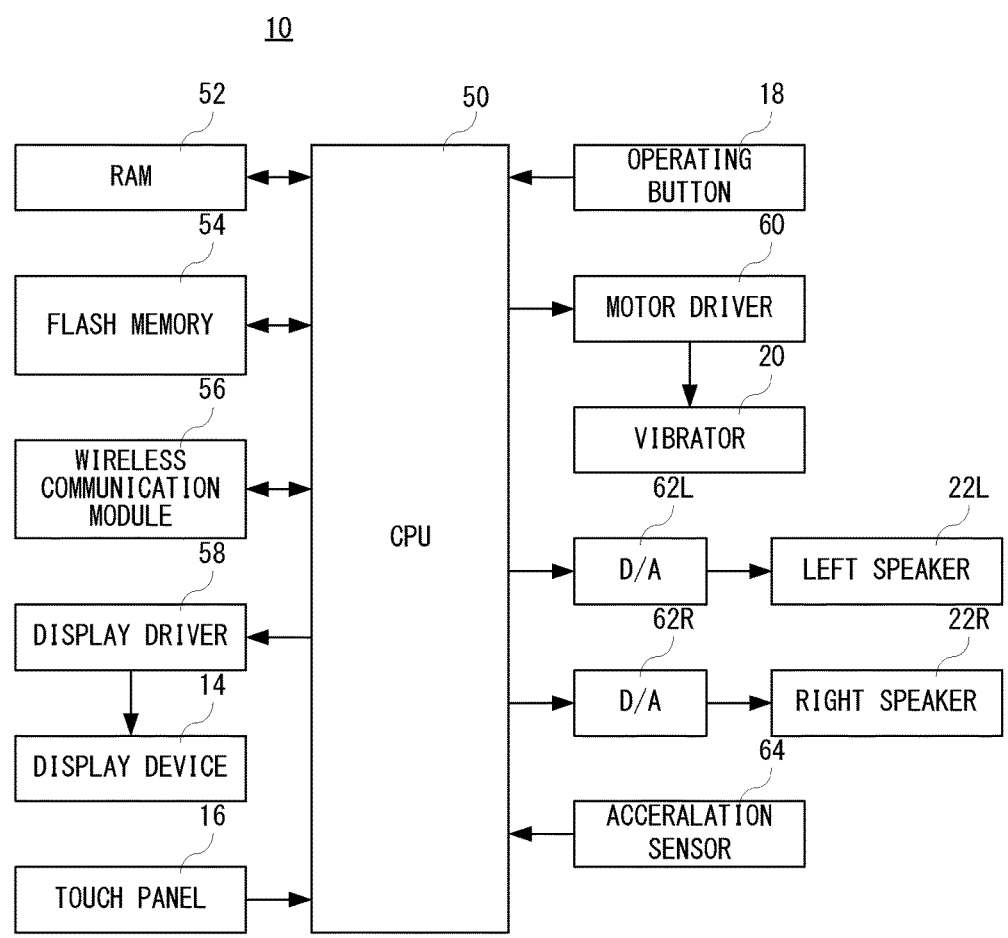
FIG. 3 is a block diagram showing a non-limiting example electric structure of the information processing apparatus.

FIG. 3 is a block diagram showing electric structure of the above-described information processing apparatuses 10. As shown in FIG. 3, the information processing apparatus 10 includes a CPU 50, and the CPU 50 is connected with the above-described touch panel 16 and operating button 18 as well as a RAM 52, the flash memory 54, a wireless communication module 56, a display driver 58, a motor driver 60, a D/A converter 62L, a D/A converter 62R and an acceleration sensor 64. Furthermore, the above-described display panel 14 is connected to the display driver 58. Furthermore, the left speaker 22L is connected to the D/A converter 62L, and the right speaker 22R is connected to the D/A converter 62R.

The touch panel 16 inputs touch coordinate data that corresponds to a touch position to the CPU 50 according to a touch input (touch operation) by the player. Furthermore, the operating button 18 inputs operation data to the CPU 50 according to an operation by the player. In this embodiment, the operation data is depression data from the operating buttons 18a, 18b and 18c. The CPU 50 stores into the RAM 52 the touch coordinate data that is input from the touch panel 16 and/or the operation data that is input from the operating button 18 according to a chronological order, and uses them for processing (information processing) of various kinds of applications such as a game, music, map, web browser, schedule, clock, etc.

The CPU 50 is in charge of entire control of the information processing apparatus 10. The RAM 52 is used as a working memory and buffer memory of the CPU 50. The flash memory 54 is used in order to store programs of various kinds of applications and to store (save) various kinds of data.

The wireless communication module 56 has a function of connecting to a wireless LAN. Therefore, the information processing apparatus 10 can communicate with a further computer and a further information processing apparatus 10 directly or via a network. Therefore, it is possible to transmit and receive programs and data to or from the further computer or the further information processing apparatus 10. For example, a program and data for a game application may be distributed from the further computer. Furthermore, it is possible to play a communication game with the further computer or the further information processing apparatus 10.

Under instructions of the CPU 50, the display driver 58 is used in order to display various kinds of screens such as a game screen 100 (see FIG. 6) and a weapon selection screen 200 (see FIG. 7) on the display panel 14. The CPU 50 uses a part of the RAM 52 as a video RAM (VRAM), and produces image data corresponding to various kinds of screens. However, a dedicated processor (GPU) for producing image data may be provided. In such a case, the GPU produces image data under instructions of the CPU 50 to the VRAM.

The motor driver 60 controls drive of the vibrator 20 under instructions of the CPU 50. As described above, the vibrator 20 is a linear motor, and is provided in the inside of the housing 12 so as to apply the vibration to the housing 12. Therefore, the vibration is transferred to fingers and the hands of the player holding the housing 12. By thus providing with the vibrator 20, the information processing apparatus 10 can generate the vibration according to the operation input using the touch panel 16 or the operating button 18, or can generate the vibration according to progress of an application, for example.

The D/A converter 62L converts the sound data applied from the CPU 50 into an analog sound signal so as to output to the left speaker 22L. Similarly, the D/A converter 62R converts the sound data applied from the CPU 50 into an analog sound signal so as to output to the left speaker 22R. For example, the sound data (sound signal) is data (signal) such as imitative sound of a virtual character or object (hereinafter, simply called "character"), sound effect, music (BGM).

The acceleration sensor 64 is an acceleration sensor of an electrostatic capacitance type, and shown in FIG. 1(B), when viewing the information processing apparatus 10 sideways from the front, it detects acceleration of each of a left-right axis direction (horizontal direction), a top-bottom axis direction (vertical direction) and a thickness axis direction of the information processing apparatus 10, and inputs acceleration data corresponding to each acceleration to the CPU 50. Therefore, for example, the CPU 50 can know a direction (inclination) and a motion of the information processing apparatus 10 (housing 12) based on an output (acceleration data) of the acceleration sensor 64, and can change a direction of a screen that is displayed on the display panel 14 according to the direction of the information processing apparatus 10. Furthermore, the CPU 50 can also use the output of the acceleration sensor 64 as instructions of the player. For example, by detecting the direction and the motion of the housing 12 according to the output of the acceleration sensor 64 according to a direction that the player inclines the housing 12 or a direction that the player moves the housing 12, it is possible to change a moving direction of the moving object in a virtual space or a direction of a virtual camera in the virtual space. In addition, the acceleration sensor 64 may be a 2-axis acceleration sensor.

In addition, the electric structure of the information processing apparatus 10 shown in FIG. 3 is a mere example, and it does not need to be limited to this.

For example, the information processing apparatus 10 may comprise a gyrosensor in place of the acceleration sensor 64 or together with the acceleration sensor 64. The gyrosensor is a piezoelectric vibration type gyrosensor, for example, and detects angular velocities around the left-right axis, the top-bottom axis and the thickness axis of the information processing apparatus 10, respectively. However, the gyrosensor may be a two-axis gyrosensor.

Figure 4:
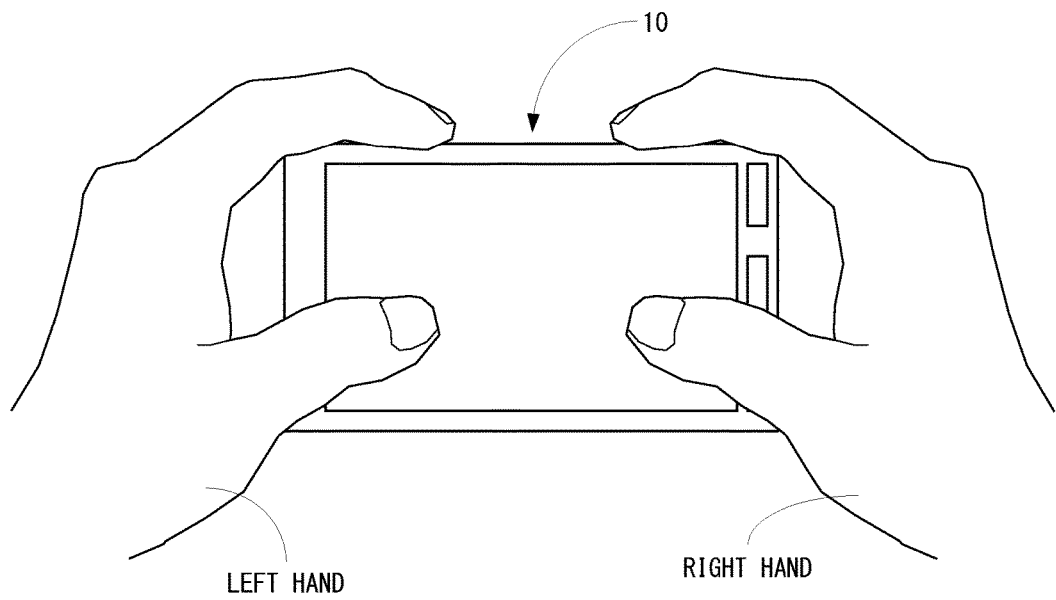
FIG. 4 is an illustrative view showing a state where a player holds with both hands the information processing apparatus sideways.

When an application such as a game is performed with such an information processing apparatus 10, as shown in FIG. 4, the information processing apparatus 10 (housing 12) is held sideways (horizontally). At this time, as also shown in FIG. 1(B), the sound emission portions 12a are turned toward a side of the player who holds the information processing apparatus 10. Furthermore, since the sound emission portions 12a are provided in a different surface from the surface that the operating button 18 and the touch panel 16 are provided, it is not closed by the hand of the player who holds the information processing apparatus 10. Therefore, the sound that is output from the speaker 22 is emitted toward the player from the sound emission portion 12a. Accordingly, the player is easy to hear the sound.

Figure 5A:
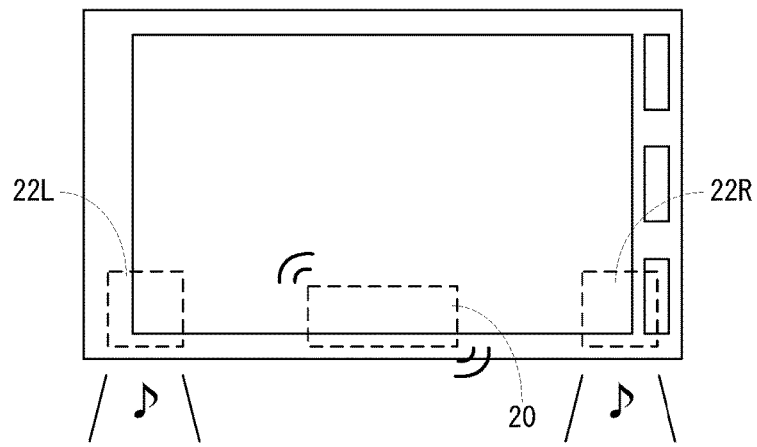
FIG. 5(A) is an illustrative view showing a manner that sounds and vibration are presented when viewing the information processing apparatus from the front.

For example, by outputting the sound from the speaker 22 and vibrating the vibrator 20 as shown in FIG. 5(A), it is possible to present information by not only the sense of hearing but the tactual sense. In addition, although it is shown in FIG. 5(A) that only the vibrator 20 vibrates, in fact, the vibration of the vibrator 20 is transferred to the housing 12, and thus, the housing 12 vibrates. Specifically, according to an operation by the player, it is possible to feed operation information (content of operation) back by the sound and the vibration. That is, the content of operation can be suggested by the sound and the vibration. Therefore, operability can be improved. Furthermore, according to an operation by the player, or irrespective of an operation by the player, it is possible to present a situation (progress situation) of an application by the sound and the vibration.

In addition, usually, a screen about an application is displayed on the display panel 14 of the information processing apparatus 10 during performing the application concerned. This is also true in the following.

For example, since the vibration of the vibrator 20 is transferred to the housing 12 in addition to the vibrations by the speakers 22 when the vibrator 20 is vibrated and the sounds are output from both the left speaker 22L and the right speaker 22R, the vibrations by the sound and the vibrator 20 are synchronized with each other. Therefore, it is possible to let the player feel the vibration strong. For example, when a rare item is acquired in a game or a game is cleared, if performing a showy representation on the game screen and if presenting the sound and the vibration being synchronous with the sound, it is possible to heap up showy representation.

Furthermore, the sounds do not need to be output simultaneously from both the left speaker 22L and the right speaker 22R. In this case, the sound as well as the vibration can be localized by vibrating the vibrator 20 while outputting the sound from the left speaker 22L, or by vibrating the vibrator 20 while outputting the sound from the right speaker 22R for example. This is based on an illusion of the player.

For example, when the character in the virtual space moves to the right from the left in the display surface of the display panel 14, the sound (sound effect, melody, BGM) that the character generates at the time of movement is output from the left speaker 22L and the vibrator 20 is vibrated. Subsequently, the above-described sound is output from the right speaker 22R and the vibrator 20 is vibrated. Then, a manner that the character moves is presented by not only the display but the sound and the vibration. In such a case, the player is deluded as the vibration of the vibrator 20 is localized in an order of left and right, for example. That is, the player has an illusion that a normal position (position) of the vibration is changed. Therefore, a manner that a character moves is transferred to the player by the vibration.

In addition, the vibrator 20 may be further vibrated in an interval before the time that the above-described sound is output from the right speaker 22R and the vibrator 20 is vibrated after the time that the above-described sound is output from the left speaker 22L and the vibrator 20 is vibrated. In such a case, the player is deluded as the vibration of the vibrator 20 is localized in an order of left, center and right, for example. In addition, when the vibration is localized at the center, the sound may be also localized at the center by outputting the sounds from both the left speaker 22L and the right speaker 22R.

When a direction that the character moves is reverse, the sounds are output from the speakers 22 and the vibrator 20 is vibrated in an order contrary to the above-described order.

Furthermore, an order that the left speaker 22L, the right speaker 22R and the vibrator 20 are output (operated) may be arbitrarily changed. As an example, a turn is changed according to a situation in the virtual space (storyline of a game, progress situation of application, etc.).

For example, the vibrator 20, the left speaker 22L (or right speaker 22R) and the right speaker 22R (or left speaker 22L) may be output (operated) in this order. Otherwise, the left speaker 22L (or right speaker 22R), the right speaker 22R (or left speaker 22L) and the vibrator 20 may be output (operated) in this order.

Furthermore, the volume of the sound that is output from the speaker 22 and the magnitude of the vibration of the vibrator 20 may be made to be linked with each other. That is, the vibration of the vibrator 20 is controlled such that the magnitude of the vibration changes in proportion or inverse proportion to the volume of the sound that is output from the speaker 22.

For example, when a character is moved toward the lower right from the upper left of the display surface of the display panel 14, a manner that the character approaches gradually can be notified (presented) by the sound and the vibration. In this case, when the character starts movement, the sound is output with a relatively small volume from the left speaker 22L, and in accordance with this, vibrator 20 is vibrated with a small magnitude. The volume of the sound that is output from the left speaker 22L is increased gradually as the character moves, and in accordance with this, the vibration of the vibrator 20 is gradually increased. If the character approaches the center of the display panel 14, the speaker 22 that should output a sound is changed from the left speaker 22L to the right speaker 22R. As the character further moves, the volume of the sound that is increased gradually, and in accordance with this, vibration of the vibrator 20 is gradually increased. Thus, it is also possible to present a manner that the character moves by the sound and the vibration.

Furthermore, in a further example, the vibrator 20 is always operated (vibrated) during the character moves, and the sound that is output from the left speaker 22L is controlled such that the volume becomes smaller gradually, and at the time that the volume becomes zero (0), the output of the sound from the right speaker 22R is started, and the sound is controlled such that the volume becomes larger gradually. Even in this way, a manner that the character in the virtual space moves to the right from the left in the display surface of the display panel 14 can be transferred to the player by the sound as well as the vibration. Furthermore, when the character is moved inversely, the left speaker 22L and the right speaker 22R may be controlled inversely.

Furthermore, in a further example, the vibrator 20 is always operated (vibrated) during the character moves, the sound that is output from the left speaker 22L is controlled such that the volume becomes smaller gradually, and the sound that is output from the right speaker 22R is controlled such that the volume becomes larger gradually. Even in this way, a manner that the character in the virtual space moves to the left from the right in the display surface of the display panel 14 can be transferred to the player by the sound as well as the vibration. Furthermore, when the character is moved inversely, the left speaker 22L and the right speaker 22R may be controlled inversely.

Furthermore, as a further example, the sound and the vibration can also notify a position in a depth direction in three-dimensional virtual space. For example, when a character exists in the distance in the virtual space, a volume of a sound that is generated by the character (sound effect, melody, BGM) is made small or a magnitude (strength) of the vibration is made small (weak). On the other hand, when the character exists near in the virtual space, the volume of the sound that is generated by the character is made large or the magnitude of the vibration is made large. Both the sound and the vibration may be output. Furthermore, the sound that is generated by the character may be output from the left speaker 22L, the right speakers 22R or those both. Furthermore, the sound and the vibration may be made larger gradually when the character moves near from the distance in the virtual space, and the sound and the vibration may be made smaller gradually when the character moves to the distance from near in the virtual space.

Figure 5B:
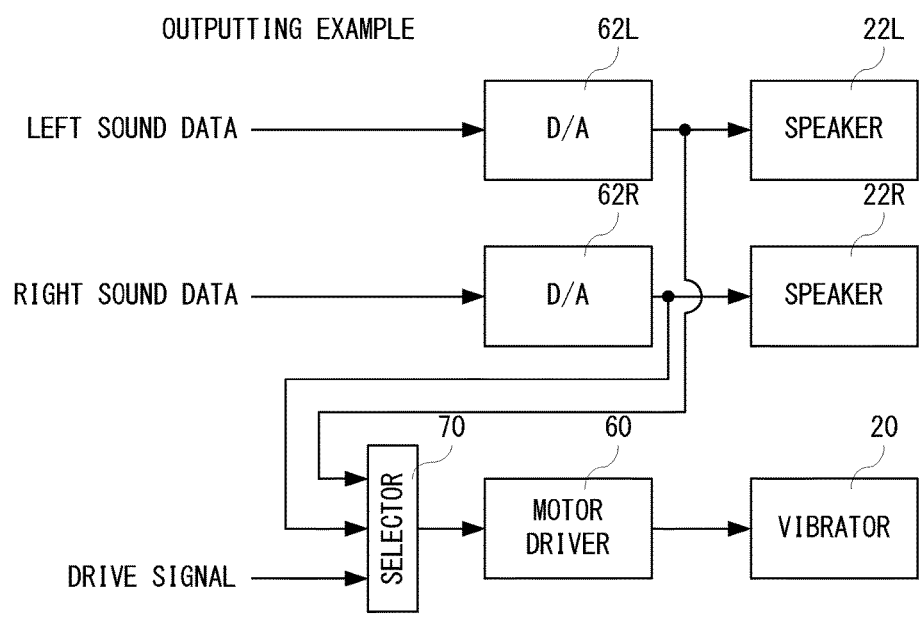
FIG. 5(B) is an illustrative view showing an outputting method of the speakers and the vibrator.

As shown in FIG. 5(B), left sound data is input to the D/A converter 62L and converted into an analog sound signal to be input to the left speaker 22L. Similarly, right sound data is input to the D/A converter 62R and converted into an analog sound signal to be input to the right speaker 22R. Although omitted in FIG. 3, the sound signal that is output from the D/A converter 62L and the sound signal that is output from the D/A converter 62R are input to the motor driver 60 via the selector 70. Furthermore, a drive signal is input to the motor driver 60 via the selector 70. However, the sound data and the drive signal are output from the CPU 50. That is, an output of the sound and presentation of the vibration are controlled by the CPU 50. Furthermore, the selector 70 is switched by the CPU 50. Therefore, the vibrator 20 is driven according to the sound signal corresponding to the left sound data, the sound signal corresponding to the right sound data or the drive signal. That is, the vibrator 20 is vibrated (operated) by a pattern according to an input waveform. Furthermore, when the sound signal according to the left sound data or the right sound data is input to the vibrator 20, it is possible to present a player the sound and vibration having a sense of unity.

Although illustration is omitted, the sound signal may be made to be input to the selector 70 through a low pass filter. In this case, a frequency component higher than a predetermined frequency is removed.

Figure 6:
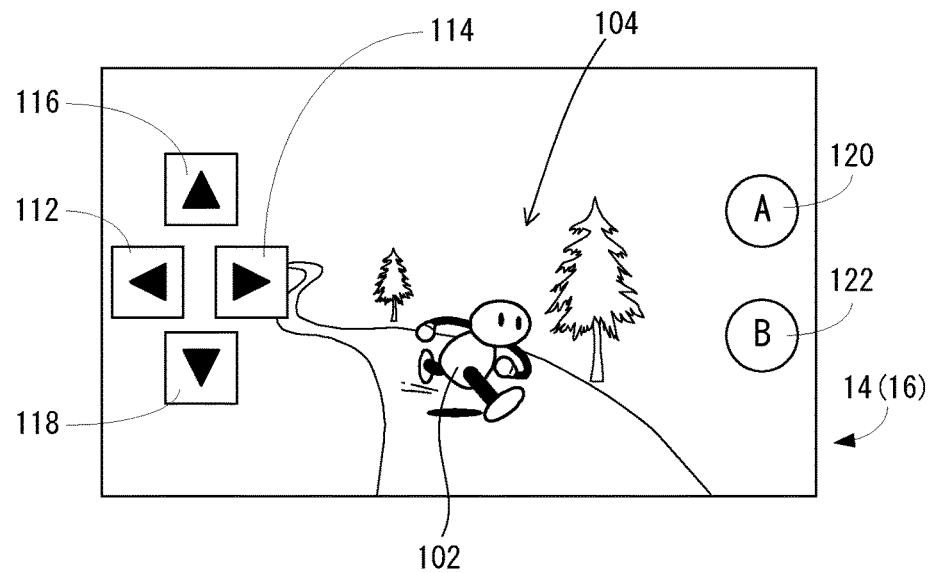
FIG. 6 is an illustrative view showing a non-limiting example game screen displayed on a display panel of the information processing apparatus shown in FIG. 1.

FIG. 6 shows an example of a case where the player plays a game while displaying a virtual game space (game screen 100) on the display panel 14 of the information processing apparatus 10. The game screen 100 is a photography image at the time that a virtual camera photographs a virtual space that a predetermined object is arranged therein. Specifically, the virtual space is a three-dimensional virtual space, in which a predetermined character or predetermined objects such as a background, a person, etc. are arranged (rendered), and a two-dimensional image that is viewed from the virtual camera (viewpoint) is produced. That is, by viewpoint conversion processing such as perspective projection transformation, an image of the three-dimensional virtual space viewed from the viewpoint is projected on a two-dimensional virtual screen, and the projected two-dimensional image is displayed as the game screen 100. In addition, the predetermined character may be a two-dimensional or three-dimensional character. Furthermore, other screens (a weapon selection screen 200 of FIG. 7 and a character input screen 300 of FIG. 9) can be produced and displayed in a similar manner.

In an example of the game screen 100 shown in FIG. 6, a player character 102 is displayed on a background image 104. The player character 102 performs arbitrary actions according to an operation by the player. A manner that the player character 102 moves (runs) on a mountain path according to an operation by the player is shown in the example of the game screen 100 shown in FIG. 6. A game of this embodiment is an action role playing game, and according to an operation by the player, the player character 102 can move in the virtual game world, fight with an enemy character including a boss character, acquire (purchase) a weapon or item, and use a weapon or item.

Furthermore, operating buttons 112, 114, 116 and 118 are displayed on a left end portion of the game screen 100, and operating buttons 120 and 122 are displayed on a right end portion of the game screen 100. That is, the operating buttons 112-118 are provided in a range that the left thumb reaches and the operating buttons 120 and 122 are provided in a range that the right thumb reaches when the player holds the information processing apparatus 10. In addition, the operating buttons 112-122 are virtual operating buttons and constituted by figures thereof and touch panel 16. This is true about virtual operating buttons (202, 204, 206, 208, 210, 212) that are displayed on the weapon selection screen 200 of FIG. 7.

The operating buttons 112, 114, 116 and 118 are provided in order to input a direction, and used in order to move the player character 102 in an arbitrary direction, for example. The operating buttons 120 and 122 are used in order to make the player character 102 perform an arbitrary action, or perform an auxiliary operation of other operating button (112, 114, 116, 118). For example, if the operating button 120 is operated (touched), the player character 102 will jump. Furthermore, if the operating button 122 is operated (touched), a speed that the player character 102 is moved will become quick.

In addition, functions of the operating buttons 112-122 explained here are mere examples, and should not be limited. Furthermore, the number of the operating buttons displayed on the game screen 100 may also differ for each game or each scene of the game. Therefore, for example, the virtual operating button may be provided in a range that is operable by a left hand or a right hand when the player holds the information processing apparatus 10 with both hands.

As described above, a drive voltage according to the sound signal or the drive signal is given to the vibrator 20. Therefore, when the operating button 112-122 is operated on the game screen 100, it is possible to notify (present) operation information and a progress situation of the game with the sound and the vibration by vibrating the vibrator 20 according to the sound signal or the drive signal.

If the operating button 120 is operated (touched), for example when the game screen 100 is displayed, the player character 102 is jumped, and the sound signal about the sound effect is input to at least one of the D/A converter 62L and the D/A converter 62R as well as the motor driver 60. Then, the vibrator 20 is vibrated in synchronous with the sound effect of jumping.

Otherwise, when the operating button 120 is operated (touched), the drive signal based on a vibration waveform at the time that a hardware push button is actually depressed is input into the motor driver 60. Then, when touching the operating button 120, the player feels the same sense as the time of depressing the hardware push button.

In addition, by performing an experimentation etc. separately, a vibration waveform at the time that an actual push button is depressed is acquired, and the drive signal is produced based on this.

Furthermore, if any one of the operating buttons 112-114 is operated, the player character 102 is moved, and the sound signal that is output in conjunction with the movement is input to at least one of the D/A converter 62L and the D/A converter 62R as well as the motor driver 60. Then, the vibrator 20 is vibrated in synchronous with the sound that is generated when moving.

Figure 7:
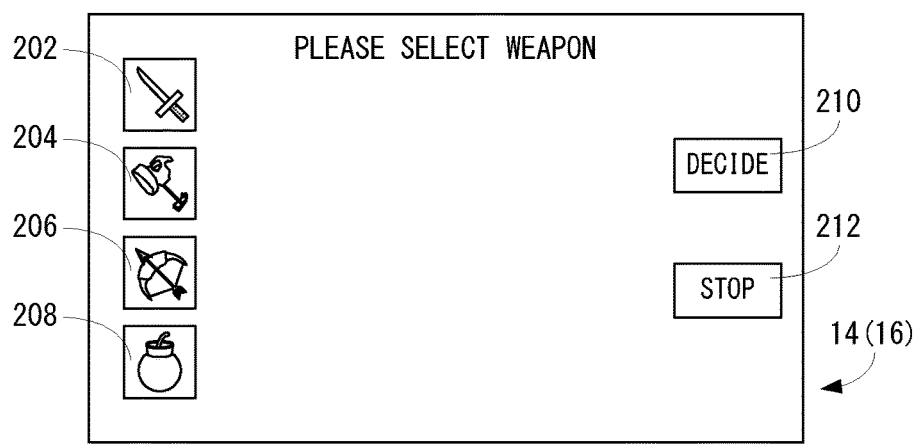
FIG. 7 is an illustrative view showing a non-limiting example weapon selection screen displayed on the display panel of the information processing apparatus shown in FIG. 1.

FIG. 7 shows an example of the weapon selection screen 200 that is displayed on the display panel 14 of the information processing apparatus 10. This weapon selection screen 200 is displayed on the display panel 14 when selecting, in the above-described game or other games, for example, a weapon that a player character (102) is equipped with.

In the weapon selection screen 200 shown in FIG. 7, operating buttons 202, 204, 206 and 208 are displayed on a left end portion of the screen, and operating button 210 and 212 are displayed on a right end portion of the screen. In also such a case, the operating buttons 202-208 are provided in a range that the left thumb reaches and the operating buttons 210 and 212 are provided in a range that the right thumb reaches when the player holds the information processing apparatus 10.

The operating buttons 202-208 are used in order to select a weapon that the player character 102 can be equipped with. The operating buttons 202-208 are respectively applied with images about weapons assigned thereto. Furthermore, the operating button 210 is used in order to decide making the player character (102) equip with the selected weapon. Furthermore, the operating button 212 is used when stopping selection of a weapon.

Furthermore, if the operating button 202 is operated (touched), for example when the weapon selection screen 200 is displayed, a sword that the player character 102 is equipped with is selected, and the sound signal about the sound effect is input to at least one of the D/A converter 62L and the D/A converter 62R as well as the motor driver 60.

Then, the vibrator 20 is vibrated in synchronous with the sound effect when selecting the sword.

Otherwise, the vibrator 20 is not vibrated when the operating button 202-208 is operated, and the vibrator 20 may be vibrated when it is determined that the weapon that is selected by operating the operating button 210 in synchronous with the sound effect according to the weapon to be equipped with.

In addition, on the weapon selection screen 200, an enlarged image of the weapon under selection may be displayed in a center of the screen. Otherwise, the player character (102) that is equipped with the weapon under selection may be displayed.

Furthermore, although illustration and detailed description are omitted, also when selecting an item that the player character 102 can use, a screen similar to the weapon selection screen 200 is displayed, and an item to be used is selected by the player.

Furthermore, in the above description, it is described that the vibrator 20 is vibrated according to the sound signal or the drive signal when the operating button 112-122 displayed on the game screen 100 or the operating button 202-212 displayed on the weapon selection screen 200 is operated; however, it does not need to be limited to this. The vibrator 20 may be vibrated according to the sound signal or the drive signal also when the hardware operating button 18 that is provided on the information processing apparatus 10 is operated. In such a case, it is also possible to notify (present) to the player operation information or a progress situation of a game with the sound and the vibration.

Furthermore, even if it is an operating button that has the same function, when a scene or a progress situation differs, the vibrator 20 may be vibrated by a different pattern. Furthermore, even if it is the same scene, the vibrator 20 may be vibrated by a different pattern according to a direction that is designated by the operating button. For example, it is thinkable that a way of vibration of the vibrator 20 is changed dependent on a case where the player character 102 is advanced in a tailwind or a case where the player character 102 advances by a headwind.

Figure 8:
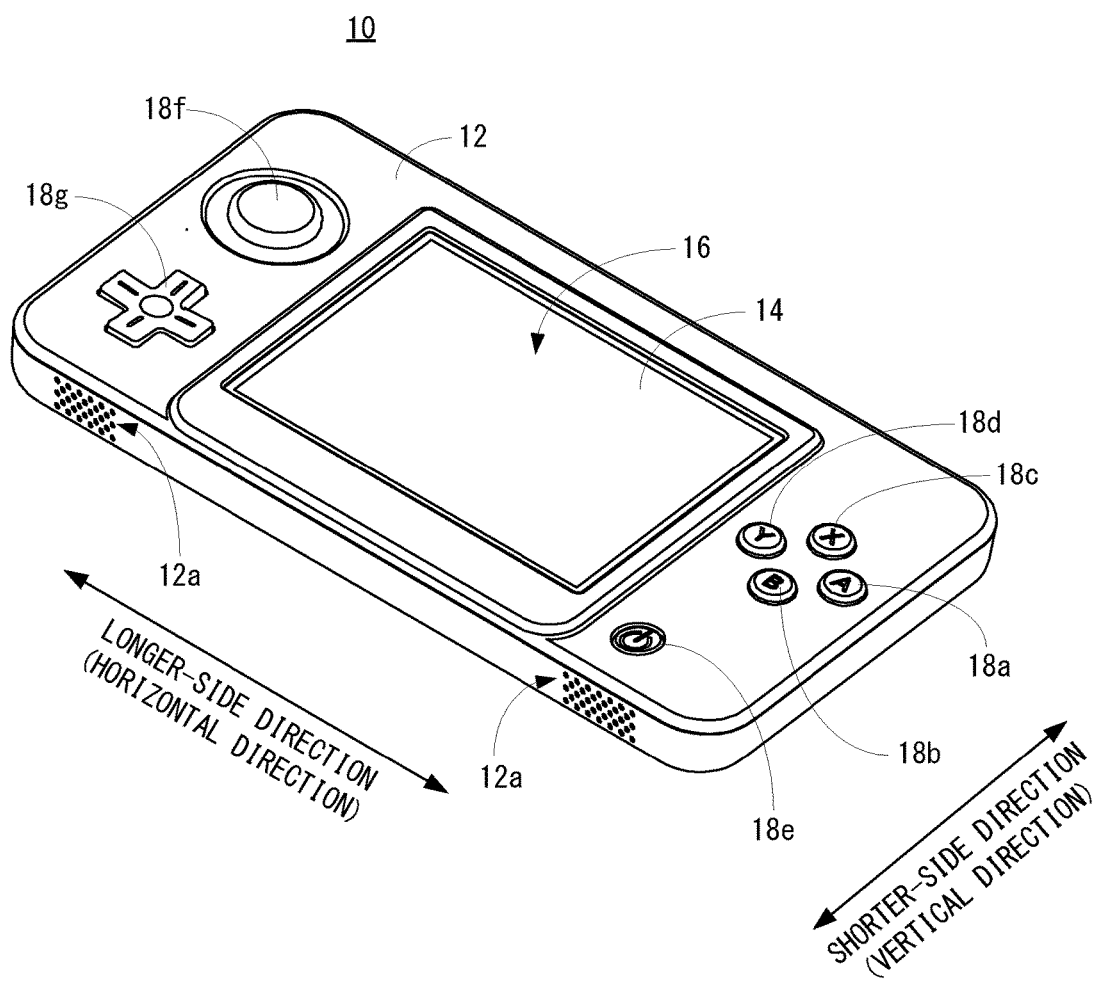
FIG. 8 is a perspective view obliquely viewing down a further non-limiting example information processing apparatus.

FIG. 8 is a perspective view obliquely viewing down the front of a further information processing apparatuses 10. The further information processing apparatuses 10 is a hand-held (portable) game apparatus, and is the same as the information processing apparatus 10 shown in FIGS. 1(A) and 1(B) except that appearance constitution differs. Although the further information processing apparatus 10 will be described in the following, the same reference numerals are applied to elements that are the same or similar to those of the information processing apparatus 10 shown in FIGS. 1(A) and 1(B).

As shown in FIG. 8, the further information processing apparatuses 10 comprises the housing 12 that is in a shape of rectangular when viewed from the front, and the display panel 14 is provided in a center of a front surface of the housing 12. The touch panel 16 is provided on the display surface of this display panel 14. Furthermore, the operating buttons 18 (18*a*, 18*b*, 18*c*, 18*d*, 18*e*, 18*f*, 18*g*) are provided on the front of the housing 12. In the example shown in FIG. 8, the operating buttons 18*a*, 18*b*, 18*c*, 18*d* and 18*e* are provided in the right of the display panel 14, and the operating buttons 18*f* and 18*g* are provided in the left of the display panel 14. The operating buttons 18*a*, 18*b*, 18*c*, 18*d* and 18*e* are push buttons, and an A button, a B button, an X button, a Y button and a power button, respectively. The operating button 18*f* is an analog pad that is formed in structure having an operating portion capable of sliding within a surface parallel to the display surface of the display panel 14, and can designate an arbitrary direction. In addition, the operating button 18*f* can input a direction as well as depression if being made in depressible structure. The operating button 18*g* is a cross-button, and can designate an upward direction, a downward direction, a leftward direction, rightward direction and oblique directions.

Although illustration is omitted, the further information processing apparatus 10 also comprises the vibrator 20, and the left speaker 22L and the right speaker 22R. Arrangement of the vibrator 20, the left speaker 22L and the right speaker 22R is the same as the arrangement shown in FIG. 1(B). Therefore, in also the further information processing apparatus 10, the sound emission portions 12*a* for emitting the sounds from the left speaker 22L and the right speaker 22R are formed on a side surface of the housing 12 at this side of places that the left speaker 22L and the right speaker 22R are provided and in the left and right end portions in the horizontal direction in which the left speaker 22L and the right speaker 22R are provided, respectively.

Electric structure of the further information processing apparatus 10 is the same as the block diagram showing in FIG. 3. It should be noted that the operating button 18 includes operating buttons 18*a*-18*g*.

The player uses the further information processing apparatus 10 by holding both end portions in the longer-side direction (horizontal direction) thereof. That is, the operating buttons 18*a*-18*e* are provided in a range operable by the thumb of the right hand holding the further information processing apparatus 10, and the operating buttons 18*f* and 18*g* are provided in a range operable by the thumb of the left hand holding the further information processing apparatus 10.

Although the further information processing apparatus 10 is a game apparatus, it can perform various kinds of applications as well as a game. As described above, it can acquire an application using the wireless communication module 56, or can also perform a communication play with other game apparatus.

In addition, by providing a slot to or from which a game card (or SD card) is attached or detached, an application can be acquired from a storage medium such as the game card. Although the storage medium is called a game card in convenience of explanation, it may store an application other than a game. The game card that is attached to the game slot is connected to the CPU 50 via an interface in a communicable manner.

Even when operating the hardware operating button 18 in the further information processing apparatuses 10, it is possible to notify (present) to the player operation information and a progress situation of the game (application) with the sound and the vibration output from the speaker 22 by vibrating the vibrator 20 as described in the above.

It is assumed that the above-described game is played with the further information processing apparatuses 10, for example, and therefore, the game screen 100 shown in FIG. 6 is displayed on the display panel 14. Then, if the operating button 18*a* is operated when the same function as the operating button 120 of FIG. 6 is assigned to the operating button 18*a* of the further information processing apparatuses 10, the player character 102 is jumped, and the sound signal about the sound effect is input to at least one of the D/A converter 62L and the D/A converter 62R as well as the motor driver 60. Then, the vibrator 20 is vibrated in synchronous with the sound effect of jumping.

Furthermore, the operating button 18*f* can designate an arbitrary direction, and a pad-like operating portion can be slid in a circumferential direction in a state any one of the directions is being designated. In such a case, it is possible to select characters arranged in the circumferential direction in the screen according to an input to the circumferential direction, for example.

In addition, the operating button 18*f* is not limited to an analog pad, and it may be an analog stick. The analog stick can designate an arbitrary direction by making a stick-like operating portion incline. Furthermore, it is possible to rotate (turn) in the circumferential direction the stick-like operating portion in a state where any one of the directions is designated.

In addition, functions of the operating-button 18*a*-18*f* explained here are mere examples, and should not be limited. The number of the operating buttons and arrangement thereof can be arbitrarily selected if being arranged within a range that the finger of the player who holds the further information processing apparatuses 10 with both hands reaches. Therefore, for example, the operating buttons may be provided in a range that is operable by the left hand or the right hand when the player holds the information processing apparatus 10 with both hands.

Figure 9:
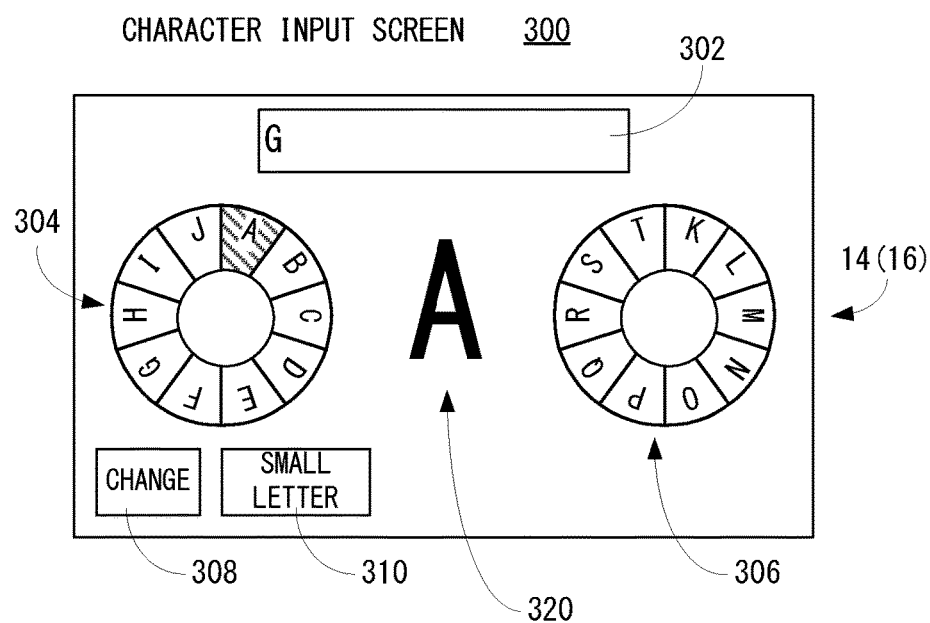
FIG. 9 is an illustrative view showing a non-limiting example character input screen displayed on a display panel of the information processing apparatus shown in FIG. 8.

FIG. 9 shows an example of a character input screen 300. A display area 302 that displays an input character is provided in an upper portion of the character input screen 300. Furthermore, a guide image 304 and a guide image 306 for selecting a character to be input are displayed in a left end portion and a right end portion of the character input screen 300. Furthermore, below the guide image 304, an operating button 308 and an operating button 310 are displayed. The operating button 308 is used in order to change characters that are displayed on the guide image 304 and the guide image 306 to other characters, numerals or signs (including a space). Hereinafter, character(s), numeral (s) and sign(s) may be called "character(s), etc." The operating button 310 is used in order to change a character that is displayed on the guide image 304 and the guide image 306 between a capital letter and a small letter. In the character input screen 300 shown in FIG. 9, for example, if the operating button 310 is operated, the characters displayed on the guide image 304 and the guide image 306 are changed to small letters, and a notation of the operating button 310 is changed to a capital letter. If the operating button 310 that a capital letter is notated is operated, the characters displayed on the guide image 304 and the guide image 306 are changed to capital letters, and a notation of the operating button 310 is changed to a small letter. Furthermore, there is provided with a display area 320 for displaying a selected character, etc. is provided between the guide image 304 and the guide image 306.

The characters, etc. that can be selected are displayed side by side on a circumference of each of the guide image 304 and the guide image 306. In the guide image 304 and the guide image 306, a character, etc. under selection is highlighted. In an example shown in FIG. 9, it is indicated that highlight display is performed by applying slant lines. In fact, the highlight display is performed by making brightness higher than other characters, applying a different color from other characters, or making it blink. Furthermore, the character, etc. under selection is enlarged in the display area 320.

The character, etc. being displayed in a direction that the operating button 18*f* is slid by operating the operating button 18*f* is selected, for example. If the operating button (the A button) 18*a*, for example is operated in such a state, the character, etc. under selection is input and an input character is displayed in the display area 302 sequentially from the left.

In the character input screen 300 shown in FIG. 9, a state where "G" is displayed in the display area 302 and "A" is selected in the display area 320 as a candidate to be input next is shown.

Although illustration is omitted, when inputting the character, etc. that is displayed on the guide image 306, by depressing the rightward button of the operating button 18g, the character, etc. to be highlighted (selected) is changed from the character, etc. that is displayed on the guide image 304 to an arbitrary character, etc. that is displayed on the guide image 306. Furthermore, when the character, etc. that is displayed on the guide image 304 is to be input from a state where the character, etc. that is displayed on the guide image 306 is being input, by depressing the leftward button of the operating button 18g, the character, etc. to be highlighted is changed from the character, etc. that is displayed on the guide image 306 to an arbitrary character, etc. that is displayed on the guide image 304.

Furthermore, the operating button 308 is selected by depressing the downward button of the operating button 18g. If the operating button 18a is depressed in a state where the operating button 308 is selected, selectable characters, etc., i.e. the characters, etc. to be displayed on the guide images 304 and the guide image 306 are changed.

Furthermore, if the leftward button or the rightward button is depressed in a state where the operating button 308 is selected, the state is changed to a state where the operating button 308 is not selected and to a state where the operating button 310 is selected. At this time, if the operating button 18a is depressed, as described above, the characters, etc. displayed on the guide image 304 and the guide image 306 are changed between a capital letter and a small letter. Furthermore, if a leftward button or a rightward button is depressed in a state where the operating button 310 is selected, the state is changed to a state where the operating button 310 is not selected and a state where the operating button 308 is selected.

For example, when the operating button 18f is slid in a circumferential direction, it is possible to notify to the player in a manner easy to understand that the character, etc. to be selected (designated) is changed by vibrating the vibrator 20 in a pattern different for each character, etc. that is selected (according to a designated direction), or by vibrating the vibrator 20 with a predetermined pattern when a designated position is moved (passed) on a boundary between the character, etc. and the character, etc.

In addition, although a case where the character, etc. is input is described the example shown in FIG. 9, it does not need to be limited to this. It is thinkable that images of weapons or items are displayed on the circumference side by side, and the weapon or item may be selected by operating the operating button 18f. In such a case, the vibrator 20 may be vibrated according to a sound signal of the sound effect for a case of equipping a weapon or using an item. By this way, even if not looking at the screen, the player can know the selected weapon or item by the sound or vibration, for example.

Furthermore, such the character input screen 300 is displayed according to the instruction by the player or at an arbitrary timing that the character, etc. is to be input.

Furthermore, although a case where the alphabet is input is described in this embodiment, it does not need to be limited to this. It is also possible to input Japanese Hiragana. In such a case, characters of consonants are displayed on the guide image 304 and characters of vowels (rows of syllables on the Japanese syllabary table that end with the vowel sounds "a" to "o") are displayed on the guide image 306, and Japanese Hiragana to be input is selected by selecting each of the consonants and the vowels. It should be noted that when the characters of Japanese Hiragana are arranged in Japanese syllabary table, consonants are "a-wa" columns and vowels are "a-o" rows.

Although detailed description is omitted, also in this further information processing apparatus 10, the vibrator 20 may be vibrated according to the sound, or the vibrator 20 may be vibrated according to an operation of operating buttons 18a-18e and 18g other than operating button 18f.

According to this embodiment, since the speakers are provided in the left and right end portions, respectively, it is possible to localize not only the sound but the vibration depending on a way of generating the sound and the vibration. Therefore, since operation information (content of operation) can be fed back by the sound and the vibration when the operating button is operated, it is possible to improve operability. Furthermore, since a progress situation of the application that is performed on the information processing apparatus can be presented by the sound and the vibration, it is possible to give a user a higher sense of immersion.

Furthermore, according to this embodiment, since the sound signal is output from the speakers and the vibrator is vibrated according to this sound signal, it is possible to synchronize the sound and the vibration with each other. Therefore, the user can feel the sound not only by the sense of hearing but by the tactual sense.

Furthermore, according to this embodiment, since the vibrator is vibrated according to the drive signal according to a vibration wave form that is measured when the hardware operating button is operated if the virtual operating button is operated, the player feels a sense of operating a hardware operating button in spite of an operation of the virtual operating button. Accordingly, it is possible to improve operability by the player.

Furthermore, according to this embodiment, since the sound emission portions are provided on a side surface of the housing of the information processing apparatus, the player can hear the sound easily because the sound emission portions turn to the player side without being covered by the hands when the player holds the information processing apparatus with the hands.

In addition, although the vibrator is arranged on a straight line that the left speaker and the right speaker are provided and in a center portion of the information processing apparatus (housing) in this embodiment, it does not need to be limited to this. For example, the vibrator may be arranged so as to overlap with one of the speakers as far as there is it between the left speaker and the right speaker. That is, the vibrator is arranged between the left and right end portions of the housing, or in a position except the left and right end portions of the housing. Furthermore, the vibrator may be arranged in a position that is the center of mass or the center of gravity of the information processing apparatus, for example. Furthermore, as far as the vibration is transferred to the left hand and the right hand of the player holding the information processing apparatus (housing) without attenuation, the vibrator may be arranged at an arbitrary portion within the housing. Therefore, it is possible to locate the vibrator in an available space that is formed by arrangement of other electronic components. For example, if the vibrator is provided in a position other than the left and right end portions of the housing, it is possible to prevent the vibration from leaning to either of the left and right end portions.

Furthermore, although the vibrator is vibrated when an input module such as the virtual operating button or the hardware operating button is operated in this embodiment, it does not need to be limited to this. For example, since the information processing apparatus comprises the acceleration sensor as another input module, the vibrator may be vibrated according to a change of the acceleration. In addition, when using the gyrosensor in place of the acceleration sensor or together with the acceleration sensor, the vibrator may be vibrated according to a change of an angular velocity, or the vibrator may be vibrated according to changes of the acceleration and the angular velocity. By this way, it is possible to present the vibration according to an operation that the information processing apparatus (housing) is tilted or rotated.

Furthermore, as a further embodiment, a posture (horizontally holding or vertically holding) of the information processing apparatus (housing) is detected based on the output of the acceleration sensor, and the two speakers may be selectively used according to the detected posture. Specifically, as shown in the embodiment, when the player holds the information processing apparatus horizontally, both the left speaker and the right speaker are used. Furthermore, when the player holds the information processing apparatus vertically, it is determined which one of the left speaker and the right speaker is located at this side (player side), and the speaker that is located at this side or the speaker that is not located at this side is used.

Furthermore, although the touch panel is provided on the display panel in this embodiment, it does not need to be limited to this. The touch panel may be provided within a range that a touch input (touch operation) to the display panel can be detected and that a finger of the player reaches when holding the information processing apparatus (housing). Therefore, the touch panel may be provided in the rear side of the housing, for example.

Furthermore, although the touch panel is provided also on the further information processing apparatus (game apparatus) in this embodiment, no touch panel may be provided.

Furthermore, although various kinds of applications are performed on the information processing apparatus alone in this embodiment, it is possible to also make the information processing apparatus function as an input device such as a controller. For example, on the game screen 100 shown in FIG. 6, only the operating buttons 112-122 are displayed while the player character 102 and the background image 104 are not displayed, and operation data according to an operation of the operating buttons 112-122 may be transmitted to a separate game apparatus. Furthermore, the weapon selection screen 200 shown in FIG. 7 may be displayed also when using the information processing apparatus as an input device. In such a case, the operation data or data of the selected weapon, etc. is transmitted to the separate game apparatus. Furthermore, the character input screen 300 shown in FIG. 9 may be displayed also when using the information processing apparatus as an input device. In such a case also, the operation data or data of the selected character, etc. is transmitted to the separate game apparatus.

Furthermore, the appearance constitution and the screens of the information processing apparatus shown in this embodiment are examples, and these should not be limited and suitably changeable according to an actual product.

In a certain aspect, a hand-held information processing apparatus comprises a housing, two speakers, and two sound emission portions. The two speakers are provided at left and right of an inside of the housing with an interval. The two sound emission portions are provided at this side of the housing when the player holds left and right end portions of the housing with both hands, and emit sounds from the two speakers, respectively.

Accordingly, when the player holds the housing with both hands, the sound emission portions can be turned to the player. Therefore, it is possible to easily hear the sound that is output from the information processing apparatus. Furthermore, since it is necessary to avoid components provided in the front of the housing of the information processing apparatus, for example when the sound emission portions are to be provided in the front of the housing, the whole apparatus becomes large; however, it is possible to prevent the whole apparatus from being made larger because the sound emission portions are provided at this side of the housing.

In a certain embodiment of this hand-held information processing apparatus, either of the two speakers is arranged in either of the left and right end portions or near.

Since either of the two speakers is thus arranged in either of the left and right end portions held by the player or near, the vibration that is generated when the speaker outputs the sound can be transferred to the player. That is, it is possible to make the player feel the sound with also the tactual sense.

In a further embodiment of this hand-held information processing apparatus, each of the two speakers is arranged in each of the left and right end portions or near. Therefore, the vibration that is generated when the speaker outputs the sound can be transferred to the player.

In a further embodiment of this hand-held information processing apparatus, an operating portion is further provided in a range that the finger of at least one hand of the player reaches when the player holds the left and right end portions with both hands. Therefore, it is easy to operate it.

At this time, the operating portion is provided at least near the speaker(s). Therefore, the vibration that is generated by the sound that the speaker outputs can be transferred to the finger of the player when the operation portion is operated.

Furthermore, the operating portion includes a button that can be operated by at least one of inclination and depression by the finger. That is, hardware operating portion can be provided.

Furthermore, a display provided on a main surface of the housing and a touch panel provided in relation to the display are further provided, and the operating portion includes virtual button that is displayed on the display and the touch panel. That is, the virtual operating portion can be provided.

In a further embodiment of this hand-held information processing apparatus, the speaker is arranged such that a vibration direction of a diaphragm is rendered in a direction perpendicular or approximately perpendicular to a main surface of the housing.

Since the vibration direction of the diaphragm of the speaker is thus rendered perpendicular or approximately perpendicular to the main surface of the housing, it is possible to lessen a thickness of the information processing apparatus than a planar size of the diaphragm.

At this time, a sound emission portion is arranged such that an emitting direction by the sound emission portion becomes perpendicular or approximately perpendicular to the vibrating direction of the diaphragm of the speaker. Therefore, it is possible to lessen a thickness of the information processing apparatus than a planar size of the diaphragm.

In a further embodiment of this hand-held information processing apparatus, a speaker is arranged at this side of the housing. That is, the speaker is arranged in a position near the sound emission portion.

Since the speaker is thus arranged in the position near the sound emission portion, it is possible to reduce attenuation of the sound inside the housing.

The above-described housing is an oblong shape, for example. Furthermore, a display is further provided on a main surface of the housing. Furthermore, each of the two speakers is provided in a position that at least a part thereof overlaps with the display when viewing the main surface from the front.

In a further embodiment of this hand-held information processing apparatus, there is further provided with a vibrator that is provided in an inside of the housing and operated by a pattern according to an arbitrary input waveform.

By thus using the vibrator, various kinds of information can be presented by a sound and vibration. Furthermore, it is possible to localize not only the sound but the vibration depending on a way of generating the sound and the vibration. Therefore, since a progress situation of an application that is performed in the information processing apparatus can be presented by the sound and the vibration, it is possible to give the player a higher sense of immersion.

For example, the vibrator is arranged in a place except the left and right end portions. Therefore, it is possible to prevent the vibration from leaning to either of the left and right end portions.

Furthermore, the vibrator is arranged between the left and right end portions. Therefore, it is possible to localize not only the sound but the vibration dependent on a way of generating the sound and the vibration. Therefore, it is possible to present various kinds of information.

Furthermore, the vibrator is arranged between the two speakers. Therefore, it is possible to localize not only the sound but the vibration depending on a way of generating the sound and the vibration.

Furthermore, the vibrator is arranged in a position that overlaps with one speaker between the two speakers.

Furthermore, the vibrator is a linear motor. Therefore, it is possible to drive the vibrator according to an analog signal such as a sound signal. Accordingly, it is possible to make the vibration synchronize with the sound that is output from the speaker.

In a further embodiment of this hand-held information processing apparatus, there is further provided with a vibration control module that operates the vibrator according to at least an operation of the operating portion. Since the vibrator is thus operated according to the operation of the operating portion, it is possible to suggest content of operation, for example depending on a way of vibrating the vibrator.

In a further embodiment of this hand-held information processing apparatus, there is further provided with a speaker control module that operates the two speakers such that volume of the sounds that are output from the two speakers are changed during the vibrator is vibrating. Accordingly, the player has an illusion such that the localization of the vibration is changed according to a change of the localization of the sound. Therefore, it is possible to present (notify) a manner that an object moves in a virtual space by the vibration, for example.

For example, the speaker control module operates the two speakers such that the volume of the sound that is output from one speaker is gradually decreased and the volume of the sound that is output from the other speaker is gradually increased.

Furthermore, the speaker control module operates the two speakers such that the volume of the sound that is output from the other speaker is gradually increased while the volume of the sound that is output from one speaker is gradually decreased.

Since the speakers are thus operated, it is possible to present (notify) a manner that an object moves in a virtual space by the vibration, for example.

In a further embodiment of this hand-held information processing apparatus, there is further provided with a vibration control module that vibrates the vibrator, and the vibration control module operates the vibrator with a magnitude in proportion or inverse proportion to the volume of the sound that is output from the speaker.

Therefore, it is possible to present various kinds of information by linking the sound and the vibration with each other.

Although certain example devices and apparatuses have been described herein, it is to be understood that the appended claims are not to be limited to the systems, devices and apparatuses disclosed, but on the contrary, are intended to cover various modifications and equivalent arrangements included within the spirit and scope of the appended claims.

What we claimed is:

1. A hand-held information processing apparatus, comprising:
    a housing;
    two speakers provided in left and right of an inside of the housing with an interval;
    a vibrator provided in the inside of the housing, and vibrated with a pattern according to an arbitrary input waveform; and
    a speaker control device configured to operate the two speakers such that a volume of sound that is output from the two speakers is changed while the vibrator is vibrating,
    wherein the speaker control device is further configured to operate the two speakers such that the volume of the sound that is output from one speaker is gradually decreased and the volume of the sound that is output from the other speaker is gradually increased.

2. The hand-held information processing apparatus according to claim 1, wherein the vibrator is arranged in a place except left and right end portions of the housing.

3. The hand-held information processing apparatus according to claim 2, wherein the speakers are arranged in or near the left and right end portions.

4. The hand-held information processing apparatus according to claim 1, wherein the vibrator is arranged between left and right end portions of the housing.

5. The hand-held information processing apparatus according to claim 1, wherein the vibrator is arranged between the two speakers.

6. The hand-held information processing apparatus according to claim 1, wherein the vibrator is arranged in a position that overlaps with one of the speakers between the two speakers.

7. The hand-held information processing apparatus according to claim 1, wherein the vibrator includes a linear motor.

8. The hand-held information processing apparatus according to claim 1, further comprising:
    two operating portions provided on left and right of the housing with an interval; and
    a vibration control device configured to vibrate the vibrator according to an operation of at least each of the two operating portions.

9. The hand-held information processing apparatus according to claim 1, wherein the speaker control device is configured to operate the two speakers such that while the volume of the sound that is output from one speaker is being gradually decreased, the volume of the sound that is output from the other speaker is gradually increased.

10. The hand-held information processing apparatus according to claim 1, further comprising a vibration control device configured to vibrate the vibrator with a magnitude in proportion, or inverse proportion, to the volume of the sound that is output from at least one of the two speakers.

11. A hand-held information processing system, comprising:
   a housing having at least a left portion and a right portion;
   a first speaker provided in the left portion of the housing;
   a second speaker provided in the right portion of the housing;
   a vibration device provided inside of the housing and vibrated with a pattern according to an input waveform; and
   a speaker control device configured to operate the first and second speakers such that a volume of sound that is output from the first and second speakers is changed while the vibration device vibrates, the speaker control device further configured to operate the first and second speakers such that the volume of the sound that is output from the first speaker is gradually decreased while the volume of the sound that is output from the second speaker is gradually increased.

* * * * *